(No Model.)
W. E. TIDLER.
HOG CATCHER.
No. 590,747. Patented Sept. 28, 1897.
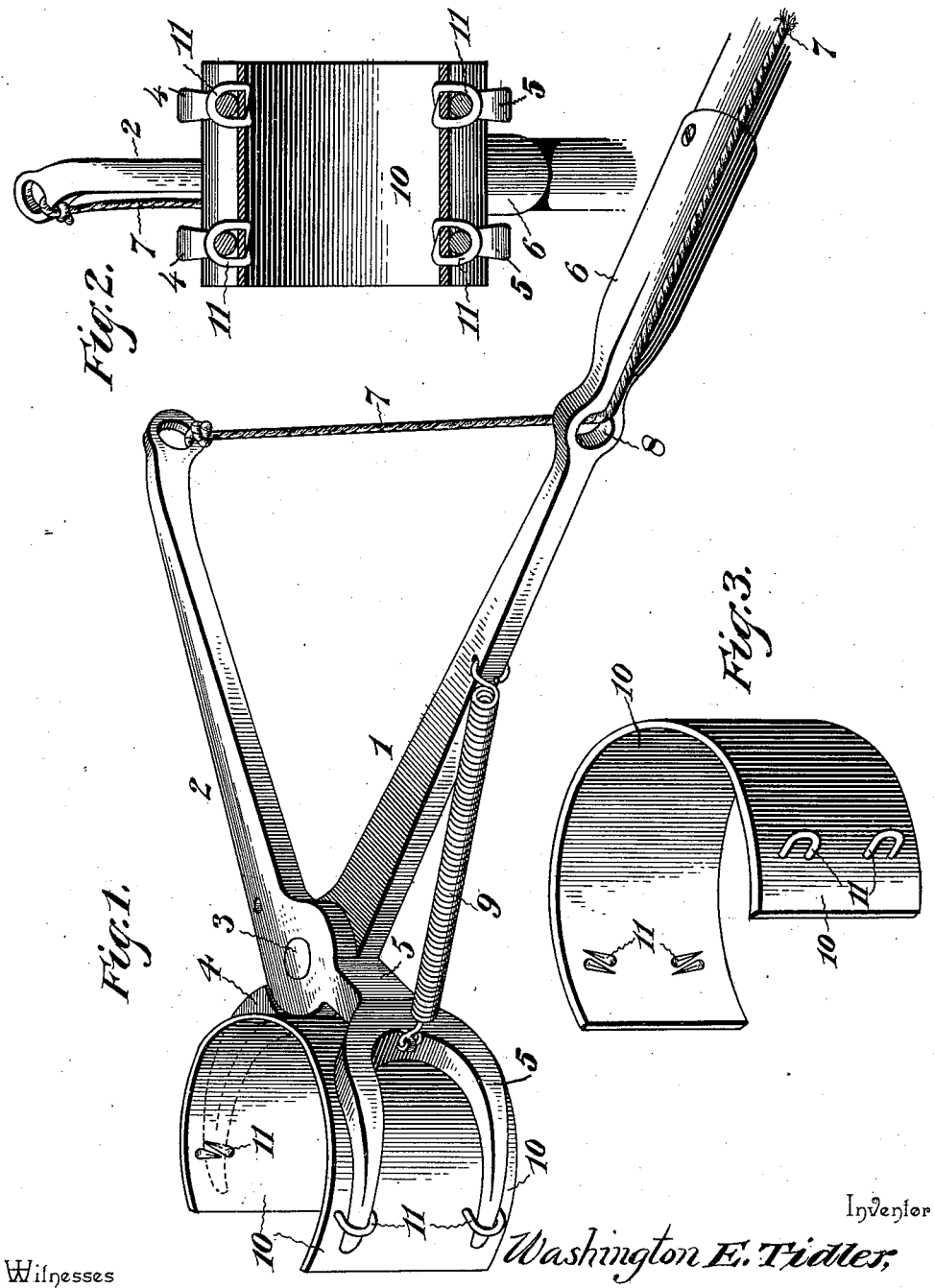
Witnesses
Harold H. Simms
Inventor
Washington E. Tidler,
By his Attorneys,
C. A. Snow & Co.

UNITED STATES PATENT OFFICE.

WASHINGTON E. TIDLER, OF CICERO, INDIANA, ASSIGNOR OF ONE-HALF TO S. C. TIDLER, OF SAME PLACE.

HOG-CATCHER.

SPECIFICATION forming part of Letters Patent No. 590,747, dated September 28, 1897.

Application filed April 20, 1897. Serial No. 633,014. (No model.)

*To all whom it may concern:*

Be it known that I, WASHINGTON E. TIDLER, a citizen of the United States, residing at Cicero, in the county of Hamilton and State of Indiana, have invented a new and useful Hog-Catcher, of which the following is a specification.

The invention relates to improvements in hog-catchers.

The object of the present invention is to improve the construction of hog-catchers and to enable the leg of an animal to be readily grasped without liability of breaking or otherwise injuring the same.

The invention consists in the construction and novel combination and arrangement of parts, as hereinafter fully described, illustrated in the accompanying drawings, and pointed out in the claim hereto appended.

In the drawings, Figure 1 is a perspective view of a hog-catcher constructed in accordance with this invention. Fig. 2 is a transverse sectional view. Fig. 3 is a detail perspective view of the shield.

Like numerals of reference designate corresponding parts in the several figures of the drawings.

1 and 2 designate bars or members connected intermediate of their ends by a pivot 3 and having their outer portions curved to form jaws 4 and 5. One of the bars or members is extended and provided with a socket 6 for the reception of a suitable pole, and the other bar or member 1 is provided at its inner end with an eye, to which is attached a rope 7, that passes through an eye or opening 8 of the bar or member 1 and extends along the pole, whereby when the rope is drawn taut the bars or members will be operated to close the jaws 4 and 5. The jaws are maintained normally open by a spiral spring 9, which is connected to the jaw 5 and the bar or member 1, so that the device may be readily pressed against the leg of an animal and the rope pulled to cause the jaws to grasp the same. Each jaw is forked or bifurcated to provide a pair of prongs which taper toward their outer ends and which are adapted to engage eyes or loops of a flexible shield 10, preferably constructed of leather and arranged within the jaws, as clearly illustrated in Fig. 1 of the accompanying drawings. Each end of the flexible shield, which is curved to conform to the configuration of the jaws, is provided with a pair of eyes or loops 11, arranged on the exterior of the shield, and the inner face of the same is smooth and is adapted to grasp the leg of a hog without breaking or otherwise injuring the same.

The flexible shield, which is readily detachable, renders the device adjustable, as it is adapted to engage animals with medium-sized legs, and when it is desired to grasp one having a considerably-larger leg the shield is removed, thereby increasing the space between the jaws.

It will be seen that the device is exceedingly simple and inexpensive in construction, that it is adapted to grasp the leg of an animal without breaking or otherwise injuring it, and that it may be arranged for operating on large or small legs.

What I claim is—

In a device of the class described, the combination of a pair of bars or members pivoted together and provided with jaws adapted for engaging the leg of an animal, said jaws being forked or bifurcated, a flexible shield arranged within and forming a lining for the jaws and provided at its ends with exteriorly-arranged eyes or loops detachably receiving the prongs, whereby the shield is removably mounted on the jaws, said shield being adapted to reduce the size of the opening between the jaws to adapt the latter for engaging smaller animals, and means for holding the jaws normally open and for operating them, substantially as described.

In testimony that I claim the foregoing as my own I have hereto affixed my signature in the presence of two witnesses.

WASHINGTON E. TIDLER.

Witnesses:
WILLIAM H. RAMSEY,
EDMUND O. STOMLY.